(12) United States Patent
Andersen

(10) Patent No.: US 8,121,556 B2
(45) Date of Patent: Feb. 21, 2012

(54) ACTIVE LOAD ISOLATOR AND WIRELESS SPEAKER FOR MIXED SIGNAL ENVIRONMENTS

(75) Inventor: Jorgen Andersen, Debary, FL (US)

(73) Assignee: Audiovox Corporation, Hauppauge, NY (US)

( * ) Notice: Subject to any disclaimer, the term of this patent is extended or adjusted under 35 U.S.C. 154(b) by 1070 days.

(21) Appl. No.: 11/778,818

(22) Filed: Jul. 17, 2007

(65) Prior Publication Data

US 2009/0023397 A1    Jan. 22, 2009

(51) Int. Cl.
*H04B 1/44* (2006.01)
(52) U.S. Cl. .............. 455/78; 455/277.1; 455/277.2; 323/220; 330/260; 330/282
(58) Field of Classification Search .......... 455/73, 455/78, 80, 82, 83, 277.1, 277.2; 323/220, 323/222, 224, 228, 229, 235, 277, 278, 280, 323/281, 282; 330/260, 282
See application file for complete search history.

(56) References Cited

U.S. PATENT DOCUMENTS

| | | | |
|---|---|---|---|
| 3,931,566 A * | 1/1976 | Pask et al. ................... 323/285 |
| 6,441,594 B1 * | 8/2002 | Connell et al. ............... 323/274 |
| 6,822,514 B1 * | 11/2004 | Aude ........................... 330/260 |
| 2002/0027786 A1 * | 3/2002 | Nakazawa et al. ......... 363/21.05 |
| 2004/0183522 A1 | 9/2004 | Gunn et al. |
| 2004/0204162 A1 * | 10/2004 | Mendoza et al. .......... 455/569.1 |
| 2006/0287745 A1 | 12/2006 | Richenstein et al. |

* cited by examiner

*Primary Examiner* — Ping Hsieh
(74) *Attorney, Agent, or Firm* — F. Chau & Associates, LLC

(57) ABSTRACT

An isolation circuit includes a low dropout operational current control loop and a shunt regulator. The current control loop is configured to drive the shunt regulator to result in a high dynamic impedance ratio between a voltage source and a load. The current control loop may include a series-pass transistor, a current sensing resistor, and a high side current sensor.

19 Claims, 3 Drawing Sheets

ACTIVE LOAD ISOLATOR AND WIRELESS SPEAKER FOR MIXED SIGNAL ENVIRONMENTS

BACKGROUND OF THE INVENTION

1. Technical Field

The present disclosure relates to an active load isolator and a method of isolating loads, and more particularly to an active load isolator to isolate low-level analog circuits from high current switching circuits, a method of isolating low-level analog circuits from high current switching circuits, and a wireless speaker that includes the active load isolator.

2. Discussion of Related Art

A transceiver is a device that has both a transmitter and a receiver. The amount of current required by the transceiver for transmission of data can be quite different from the amount of current required for reception of data. For example, assume that the transceiver requires 450 mA for sending data and 35 mA for receiving data. The transceiver may be expected to rapidly alternate between transmitting and receiving data. As an example, the transceiver may be attached to a wireless speaker. In such a configuration, the transceiver would be constantly switching between receiving audio signals from a source and sending acknowledgements back to the source. This constant switching requires supplying the transceiver with alternating current amounts, for example, 35 mA and 450 mA. However, this constant switching induces low-level signal disturbances into the circuits that are attached to the transceiver. When the transceiver is attached to a speaker amplifier, the low-level signals disturbances can be translated into audible noise.

Thus, there exists a need for a circuit that can isolate a low-level circuit, such as a speaker amplifier, from signal disturbances induced by a current switching circuit, such as transceiver.

SUMMARY OF THE INVENTION

According to an exemplary embodiment of the present invention there is provided an isolation circuit which includes a low dropout operational current control loop and a shunt regulator. The current control loop is configured to drive the shunt regulator to result in a high dynamic impedance ratio between a voltage source and a load.

The current control loop may include a series-pass transistor, a current sensing resistor, and a high side current sensing circuit. The series-pass transistor may be one of a FET or BJT transistor. The high side current sensor may be a transconductance amplifier.

The voltage source may be set to minimize a voltage drop across the current sensing resistor and the series-pass transistor. The dynamic impedance of the series-pass transistor collector or FET drain may be thousands of times greater than the dynamic impedance of the shunt regulator.

The isolation circuit may include circuitry to minimize the voltage drop across the current sensing resistor and the series-pass transistor. The isolation circuit may include a common mode choke to decouple power and ground connections to the load isolator circuit from other circuits, such as low-level analog circuits.

According to an exemplary embodiment of the present invention there is provided a method of isolating a current switching device which includes using a load dropout current control loop to drive a shunt regulator to result in a high dynamic impedance ratio between a voltage source and the current switching device. The current control loop may include a series-pass transistor, a current sensing resistor, and a high side current sensor. The high side current sensor may include a transconductance amplifier.

The method may further include minimizing a voltage drop across the current sensing resistor and the series-pass transistor, and/or decoupling an input voltage that is applied to the current switching circuit, and/or using a common mode choke to reduce noise from the voltage source.

According to an exemplary embodiment of the present invention there is provided a wireless speaker which includes an RF transceiver, a speaker amplifier, a speaker, and an isolation circuit to supply power to the RF transceiver to isolate current switching effects of the RF transceiver from the speaker and the speaker amplifier. The isolation circuit includes a low dropout operational current control loop and a shunt regulator. The current control loop is configured to drive the shunt regulator to result in a high dynamic impedance ratio between a voltage source and a load.

The current control loop may include a series-pass transistor, a current sensing resistor, and a high side current sensor. The series-pass transistor may be one of a FET or BJT transistor. The high side current sensor may be a transconductance amplifier.

The voltage source may be set to minimize a voltage drop across the current sensing resistor and the series-pass transistor. The voltage source may be configured to set an impedance of the series-pass transistor to be at least 1000 times the impedance of the shunt regulator.

These and other exemplary embodiments, aspects, features and advantages of the present invention will be described or become more apparent from the following detailed description of exemplary embodiments, which is to be read in connection with the accompanying figures.

BRIEF DESCRIPTION OF THE DRAWINGS

Exemplary embodiments of the invention can be understood in more detail from the following descriptions taken in conjunction with the accompanying drawings in which.

DETAILED DESCRIPTION OF THE EXEMPLARY EMBODIMENTS

In general, exemplary embodiments systems and methods to isolate low-level analog circuits from high current switching circuits will now be discussed in further detail with reference to illustrative embodiments of FIGS. 1-3. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
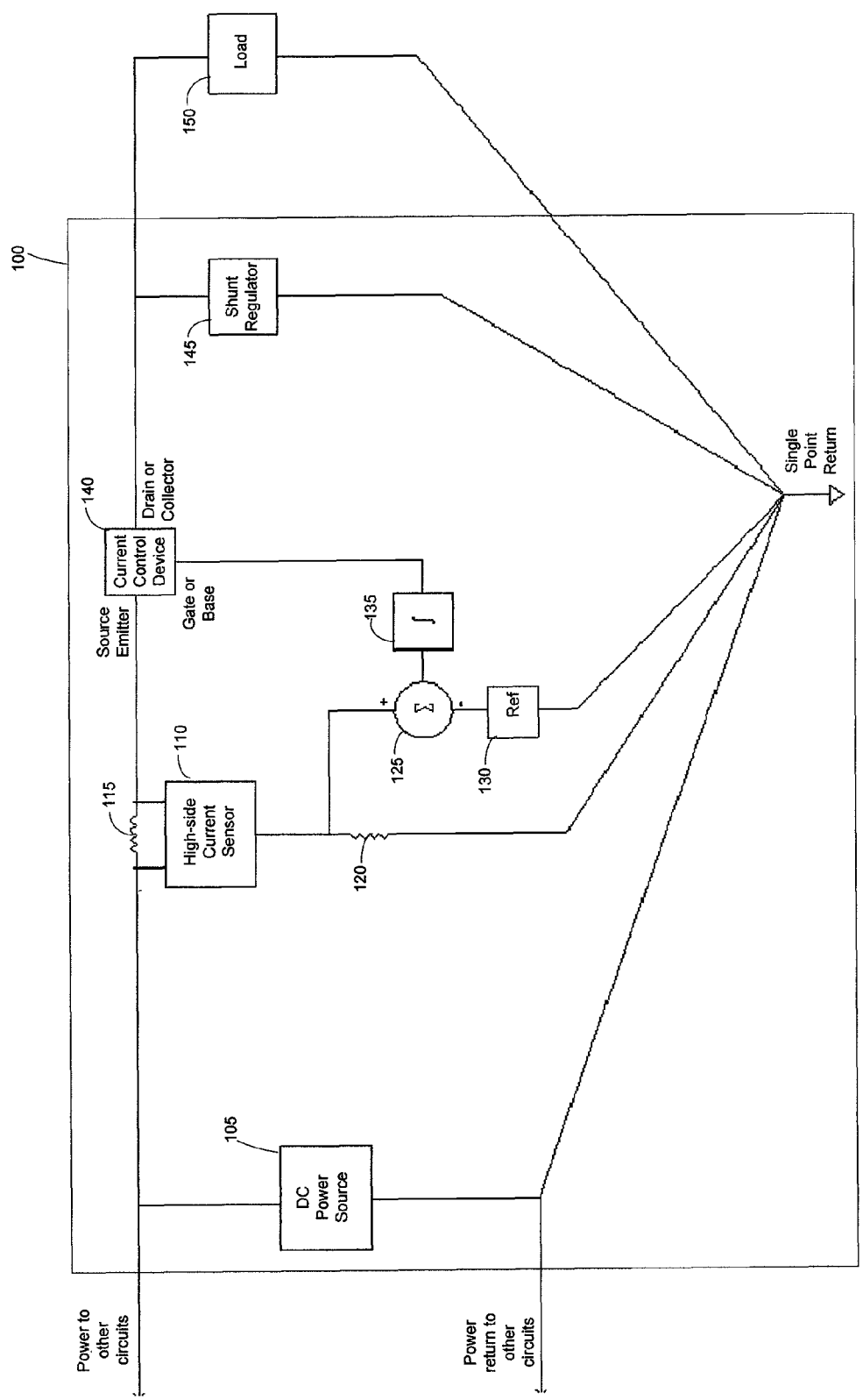
FIG. 1 illustrates a high level block diagram of a load isolator circuit according to an exemplary embodiment of the present invention.

FIG. 1 illustrates a high level block diagram of a load isolator circuit according to an exemplary embodiment of the present invention. The load isolator circuit 100 is connected to a load 150. The load isolator circuit includes a DC power source 105, a current sensing resistor 115, a high side current sensor 110, a resistor 120, a summing junction 125, a reference voltage 130, an integrator 135, a current control device 140, and a shunt regulator 145. The isolator circuit 100 may include a single point return.

The circuit elements of the isolator circuit 100 are configured to result in a high dynamic impedance ratio between the DC power source 105 and the load 150. When the load 150 is a transceiver with different current requirements for transmitting and receiving, noise can be produced when the transceiver switches between receiving and transmitting at an audible repetition rate. The isolator circuit 100 tends to reduce this noise.

Figure 2:
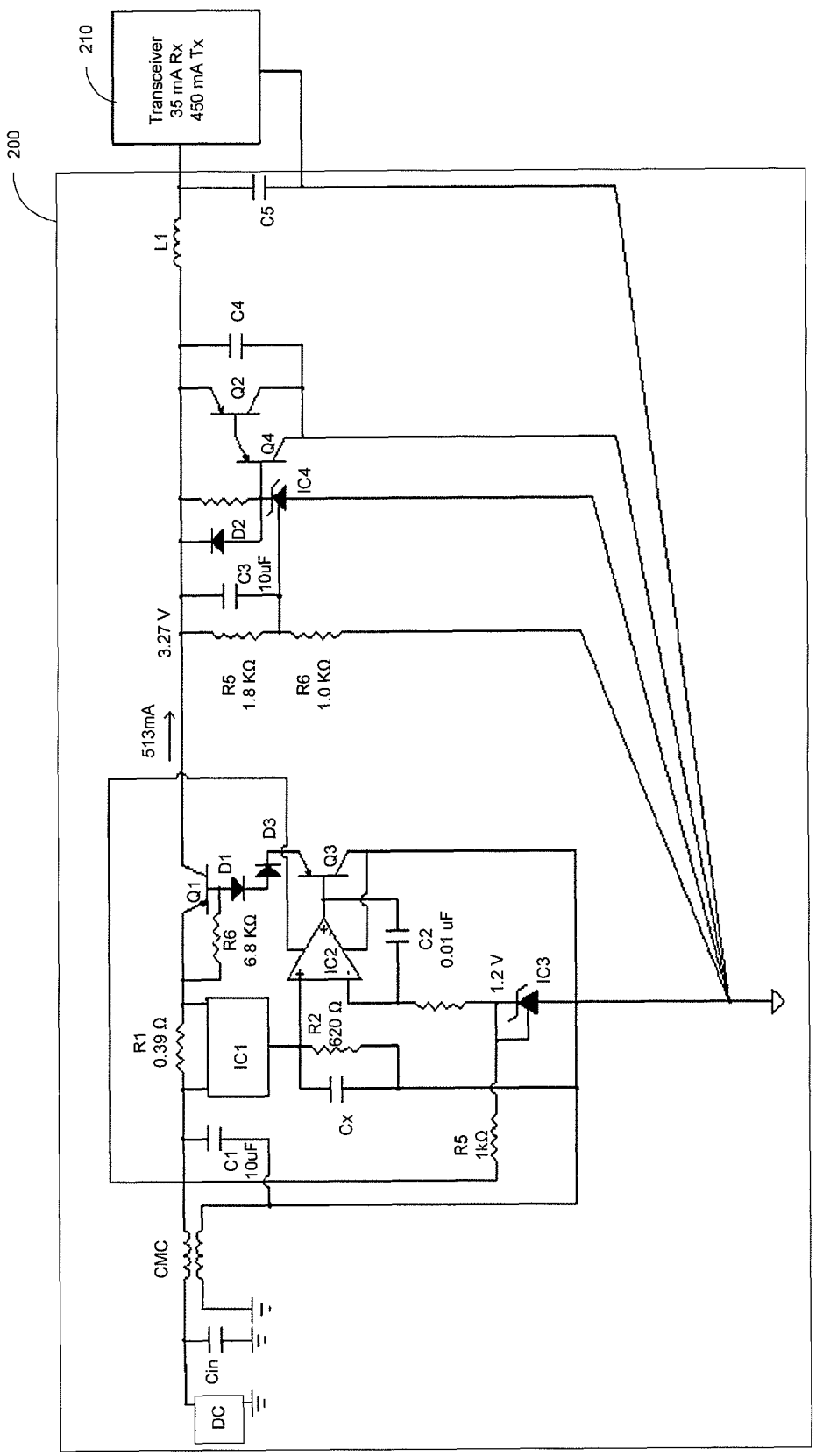
FIG. 2 illustrates a load isolator circuit according to an exemplary embodiment of the present invention.

FIG. 2 illustrates a load isolator circuit according to an exemplary embodiment of the present invention. Referring to FIG. 2, the isolator circuit 200 is electrically connected to a load, such as a transceiver 210. The isolator circuit 200 uses the high dynamic impedance of an uncommitted collector junction (e.g., for a BJT) or a drain (e.g., for a FET) controlled by a high side current sensor IC1 actuating an operational servo loop 210. The uncommitted collector junction is from a series pass transistor Q1 which may be embodied as a TIP 32 PNP Epitaxial Silicon Transistor.

The isolation achieved by the isolator circuit 200 is the ratio of the collector dynamic impedance of the series pass transistor Q1 to the dynamic impedance of the shunt regulator circuit 220. The shunt regulator circuit 220 includes a regulator IC4, and two transistors Q2 and Q4. The two transistors Q2 and Q4 comprise a Darlington circuit. For a lower shunt regulator operating current, a single transistor would suffice. The shunt regulator may be embodied by a LMV431CZ adjustable shunt regulator. While the chosen shunt regulator need not be adjustable, an adjustable shunt regulator is preferred for versatility. The transistor Q2 may be both embodied by a TIP 32 transistor and the other transistor Q4 may be embodied by a 2N3906 small signal transistor to save space and reduce cost. However, the present invention is not limited to the above transistor types, as the transistors Q2 and Q4 may be embodied by any PNP transistors, scaled for the appropriate voltage and current requirements of a particular application.

The collector dynamic impedance of the series pass transistor Q1 may range between a few thousand ohms to tens of thousands of ohms depending on the chosen transistor type. The dynamic impedance of the shunt regulator 220 may be in the order of tens of milliohms. The minimum input voltage of the isolator circuit 200 is governed by the voltage drop across the current sense resistor R1 and the saturation voltage (VceSAT) of the series pass transistor Q1. The resistance value of R1 depends on the optimal value for the high side current sensor 110 that minimizes the voltage drop required across R1. The high side current sensor 110 is more accurate for voltage drops >0.1V, but it is, preferred that the drops be minimized. For example, the voltage drop across the current sense resistor R1 is typically around 200 mv. The VceSat voltage can range from 20-50 mV to as much as 1V, depending upon the device and circuit conditions. For example, the VceSat voltage is typically around 500 mv. For example, a 3.3 volt switching circuit can be isolated with an input voltage as little as 3.9 volts, providing more than 60 dB and sometimes 80 dB of isolation.

The series pass transistor Q1 functions as a current source. Current is metered by the voltage drop across the resistor R1. The voltage drop across the resistor R1 is 200 mV, and is governed by the 1.24V voltage drop forced across the resistor R2 by the operational servo loop 220 comprised of the operational amplifier IC2 and the voltage reference IC3. The operational servo loop 220 is configured as a zero position error servo loop, so the voltage drop across the resistor R2 is forced to be equal to the reference voltage from the voltage reference IC3, for example 1.24V. This relationship exists because the transconductance of the high side current sensor IC1 is 10 mmho. The high side current sensor IC1 may be embodied by a ZXCT1009 High-side current monitor to reduce cost.

As long as the input voltage at pin 2 of the high side current sensor IC1 is above approximately 4 volts, the series pass transistor Q1 will be in the active region and the dynamic collector impedance will be hoE, which is several thousand ohms for a TIP 32 transistor. While the input voltage may be much higher than 4 volts, as the voltage increases beyond 4 volts, a greater amount of power is dissipated by the isolation circuit, generating undesirable heat and reducing efficiency.

The 4 volt input requirement to the isolator circuit 200 is dictated by the voltage drop across the resistor R1, the $VCE_{SAT}$ of the series pass transistor Q1, and the voltage of the shunt regulator 220 realized at the emitter of the transistor Q2. An overhead voltage of approximately 700 mv is required to keep the series pass transistor Q1 in the active region. It is important to keep the transistor in the active region because the dynamic collector-emitter impedance of a saturated transistor is very low, destroying the isolation provided by the high dynamic collector impedance of the series pass transistor Q1.

The collector of the series pass transistor Q1 acts as a constant current source to the shunt voltage regulator 220. The terminal impedance ratio between the collector and the shunt voltage regulator 220 provides high isolation between the transceiver 290 and a source voltage input to the high side current sensor IC1 and the current sensing resistor R1. For the circuit values shown in FIG. 2, the transceiver 290 appears to be a steady state load of approximately 513 mA, making the transceiver-supply disturbances benign to other circuits deriving their power from the same prime power source.

Figure 3:
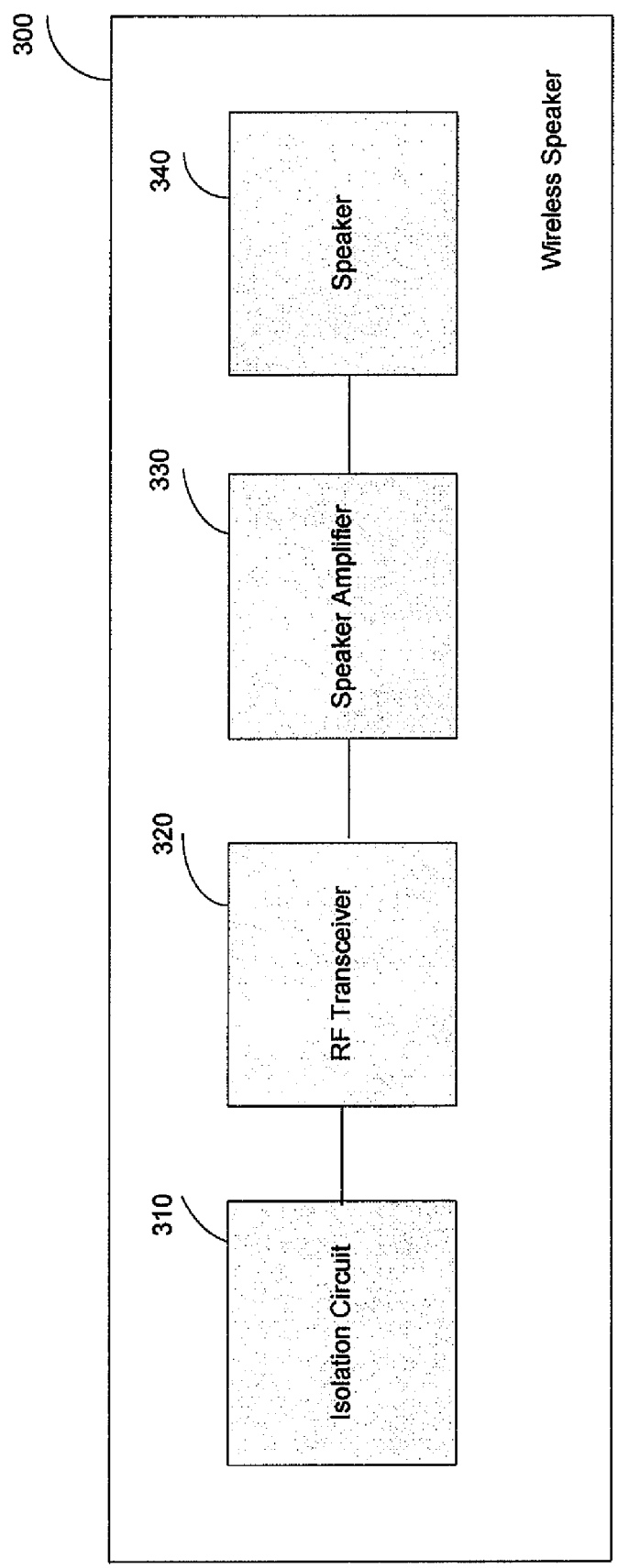
FIG. 3 illustrates a wireless speaker including a load isolator circuit according to an exemplary embodiment of the present invention.

FIG. 3 illustrates a wireless speaker including a load isolator circuit according to an exemplary embodiment of the present invention.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. An isolation circuit for a wireless speaker, comprising:
   a low dropout operational current control loop; and
   a shunt regulator,
   wherein the current control loop is configured to drive the shunt regulator to result in a high dynamic impedance ratio between a power source and a load,
   wherein the current control loop comprises:
      a series-pass transistor;
      a current sensing resistor connected between the power source and the series-pass transistor;
      a high side current sensor connected in parallel across the current sensing resistor; and
      an integrator receiving an output based on an output of the sensor, wherein the integrator comprises an operational amplifier and a capacitor connected across an output and input of the operational amplifier, the output of the operational amplifier controlling the gate terminal of the series-pass transistor.

2. The isolation circuit of claim 1, wherein the high side current sensor is a transconductance amplifier.

3. The isolation circuit of claim 1, wherein the power source is set to minimize a voltage drop across the current sensing resistor and the series-pass transistor.

4. The isolation circuit of claim 1, wherein the series-pass transistor is one of a FET or BJT transistor.

5. The isolation circuit of claim 1, further comprising a decoupling capacitor connected across the shunt regulator.

6. The isolation circuit of claim 1, further comprising a common mode choke connected between the power source and the current sensing resistor.

7. The isolation circuit of claim 1, further comprising a summing junction, wherein an output terminal of the high side current sensor is coupled to an input terminal of the summing junction and an output of the summing junction is coupled to an input of the operational amplifier.

8. The isolation circuit of claim 1, wherein the shunt regulator is connected to a non-gate terminal of the series-pass transistor.

9. The isolation circuit of claim 1, wherein the input of the operational amplifier is an inverting input terminal.

10. A wireless speaker, comprising:
a radio frequency RF transceiver;
a speaker amplifier;
a speaker; and
an isolation circuit to supply power to the RF transceiver to isolate current switching effects of the RF transceiver from the speaker and the speaker amplifier, the isolation circuit comprising a current control loop and a shunt regulator,
wherein the current control loop comprises:
a series-pass transistor;
a current sensing resistor connected between a power source and the series-pass transistor;
a current sensor connected in parallel across the current sensing resistor; and
an integrator comprising an operational amplifier and a capacitor connected across an output and input of the operational amplifier, the output of the operational amplifier controlling the gate terminal of the series-pass transistor.

11. The wireless speaker of claim 10, wherein the current sensor is a transconductance amplifier.

12. The wireless speaker of claim 10, wherein the power source is set to minimize a voltage drop across the current sensing resistor and the series-pass transistor.

13. The wireless speaker of claim 10, wherein the series-pass transistor is one of a FET or BJT transistor.

14. The wireless speaker of claim 10, further comprising a decoupling capacitor connected across the shunt regulator.

15. The wireless speaker of claim 10, further comprising a common mode choke connected between the power source and the current sensing resistor.

16. The wireless speaker of claim 10, further comprising a summing junction, wherein an output terminal of the high side current sensor is coupled to an input terminal of the summing junction and an output terminal of the summing junction is coupled to an input of the operational amplifier.

17. The wireless speaker of claim 10, wherein the shunt regulator is connected to a non-gate terminal of the series-pass transistor.

18. An isolation circuit for a wireless speaker, comprising:
a current control loop; and
a shunt regulator,
wherein the current control loop comprises:
a series-pass transistor; and
a current sensing resistor connected between a power source and the series-pass transistor;
a current sensor connected in parallel across the current sensing resistor;
a summing junction receiving an output of the high side current sensor and a reference voltage; and
an integrator coupled between an output of the summing junction and a gate terminal of the series-pass transistor, wherein the integrator comprises an operational amplifier and a capacitor connected across an input and an output of the operational amplifier,
wherein the shunt regulator is connected to a non-gate terminal of the series-pass transistor.

19. The isolation circuit of claim 18, wherein the input of the operational amplifier is an inverting input terminal.

* * * * *